United States Patent
Fukushima et al.

(10) Patent No.: US 12,407,052 B2
(45) Date of Patent: Sep. 2, 2025

(54) ELECTROCHEMICAL CELL

(71) Applicant: KYOCERA CORPORATION, Kyoto (JP)

(72) Inventors: Takaaki Fukushima, Daito (JP); Wataru Kato, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 626 days.

(21) Appl. No.: 17/779,557

(22) PCT Filed: Nov. 17, 2020

(86) PCT No.: PCT/JP2020/042857
§ 371 (c)(1),
(2) Date: May 25, 2022

(87) PCT Pub. No.: WO2021/106691
PCT Pub. Date: Jun. 3, 2021

(65) Prior Publication Data
US 2023/0006296 A1  Jan. 5, 2023

(30) Foreign Application Priority Data
Nov. 27, 2019 (JP) .................. 2019-214401

(51) Int. Cl.
  *H01M 50/242* (2021.01)
  *H01M 10/04* (2006.01)
  (Continued)

(52) U.S. Cl.
  CPC ....... *H01M 50/242* (2021.01); *H01M 50/211* (2021.01); *H01M 50/224* (2021.01);
  (Continued)

(58) Field of Classification Search
  None
  See application file for complete search history.

(56) References Cited

U.S. PATENT DOCUMENTS

| 9,203,064 B2 * | 12/2015 | Lee .............. H01M 50/119 |
| 2010/0266883 A1 * | 10/2010 | Koetting ........ H01M 10/6551 |
| | | 429/96 |

(Continued)

FOREIGN PATENT DOCUMENTS

| EP | 3890045 A1 | 10/2021 |
| JP | 2000-285967 A | 10/2000 |

(Continued)

OTHER PUBLICATIONS

Machine Translation of JP-2010055955-A (Year: 2010).*

*Primary Examiner* — Gregg Cantelmo
(74) *Attorney, Agent, or Firm* — HAUPTMAN HAM, LLP

(57) ABSTRACT

An electrochemical cell includes a cell stack including a plurality of unit cells stacked on one another and each being a plate and including an electricity generator and a casing accommodating the electricity generator, and an outer case accommodating the cell stack. The outer case includes at least one rib in a surface area between an outer edge of the outer case and an outer periphery of the cell stack as viewed in a stacking direction of the cell stack. The at least one rib is a portion of the surface area protruding outward.

15 Claims, 6 Drawing Sheets

(51) Int. Cl.
　　　*H01M 10/613*　　(2014.01)
　　　*H01M 10/647*　　(2014.01)
　　　*H01M 50/105*　　(2021.01)
　　　*H01M 50/211*　　(2021.01)
　　　*H01M 50/224*　　(2021.01)
　　　*H01M 50/227*　　(2021.01)
　　　*H01M 50/231*　　(2021.01)
　　　*H01M 50/291*　　(2021.01)
　　　*H01M 50/293*　　(2021.01)
(52) U.S. Cl.
　　　CPC ....... *H01M 50/227* (2021.01); *H01M 50/231* (2021.01); *H01M 10/0481* (2013.01); *H01M 10/613* (2015.04); *H01M 10/647* (2015.04); *H01M 50/105* (2021.01); *H01M 50/291* (2021.01); *H01M 50/293* (2021.01)

(56) References Cited

U.S. PATENT DOCUMENTS

| | | | |
|---|---|---|---|
| 2012/0064383 A1* | 3/2012 | Tonomura | H01M 50/557 |
| | | | 429/99 |
| 2013/0209850 A1* | 8/2013 | Yokoyama | H01M 10/0481 |
| | | | 429/99 |
| 2018/0212207 A1 | 7/2018 | Mino et al. | |

FOREIGN PATENT DOCUMENTS

| | | | | |
|---|---|---|---|---|
| JP | 2010055955 A | * | 3/2010 | |
| JP | 201218866 A | | 1/2012 | |
| JP | 5287104 B2 | | 9/2013 | |
| JP | 2015230812 A | | 12/2015 | |
| WO | WO-2011108857 A2 | * | 9/2011 | ........ H01M 10/0413 |
| WO | 2016084273 A1 | | 6/2016 | |
| WO | 2020110937 A1 | | 6/2020 | |

* cited by examiner

ELECTROCHEMICAL CELL

RELATED APPLICATIONS

The present application is a National Phase of International Application Number PCT/JP2020/042857, filed Nov. 17, 2020, which claims priority to Japanese Application No. 2019-214401, filed Nov. 27, 2019.

FIELD

The present disclosure relates to an electrochemical cell.

BACKGROUND

A known technique is described in, for example, Patent Literature 1.

CITATION LIST

Patent Literature

Patent Literature 1: Japanese Patent No. 5287104

BRIEF SUMMARY

An electrochemical cell according to an aspect of the present disclosure includes a cell stack including a plurality of unit cells stacked on one another and each being a plate and including an electricity generator and a casing accommodating the electricity generator, and an outer case accommodating the cell stack. The outer case includes at least one rib in a surface area between an outer edge of the outer case and an outer periphery of the cell stack as viewed in a stacking direction of the cell stack. The at least one rib is a portion of the surface area protruding outward.

An electrochemical cell module according to another aspect of the present disclosure includes a plurality of the above electrochemical cells, a current collector electrically connecting the plurality of electrochemical cells to one another, and a housing accommodating the plurality of electrochemical cells.

BRIEF DESCRIPTION OF DRAWINGS

The objects, features, and advantages of the present disclosure will become more apparent from the following detailed description and the drawings.

DETAILED DESCRIPTION

As an electrochemical cell with the structure that forms the basis of the structure according to one or more embodiments of the present disclosure, a known electrochemical cell includes a cell body functioning as a battery accommodated in an outer case (for example, Patent Literature 1). Such an electrochemical cell has connection terminals connectable to an external device. The connection terminals extending from the inside to the outside of the outer case are connected to the cell body inside the outer case.

In the electrochemical cell with the structure that forms the basis of the structure according to one or more embodiments of the present disclosure, the outer case may easily deform due to, for example, an impact, thus causing misalignment of the cell body accommodated in the outer case. This may cause, for example, deformation of portions connecting the connection terminals to the cell body. The electrochemical cell may thus have lower durability.

An electrochemical cell according to one or more embodiments of the present disclosure will now be described with reference to the drawings.

Figure 1:
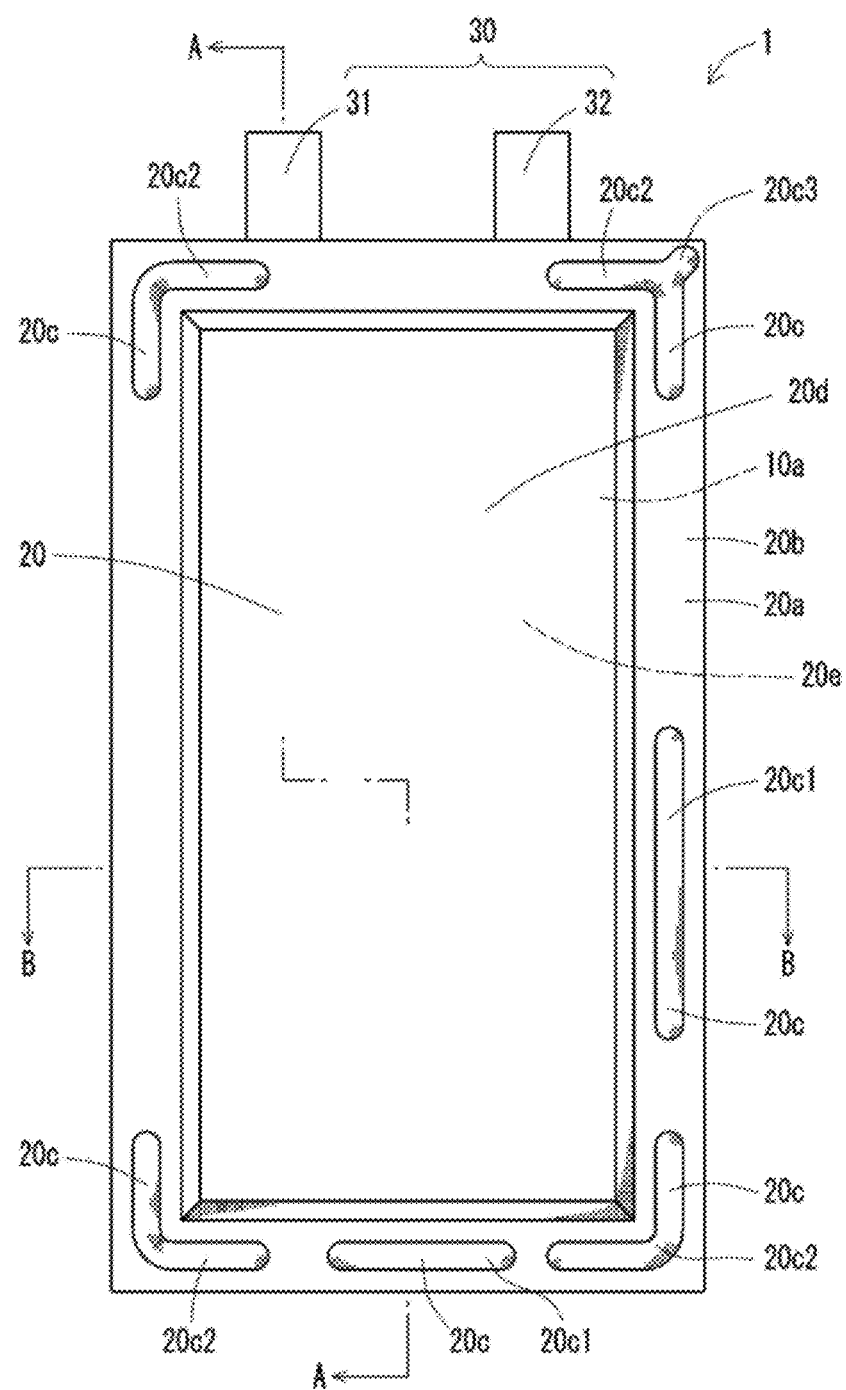
FIG. 1 is a plan view of an example electrochemical cell according to an embodiment of the present disclosure.
Figure 2:
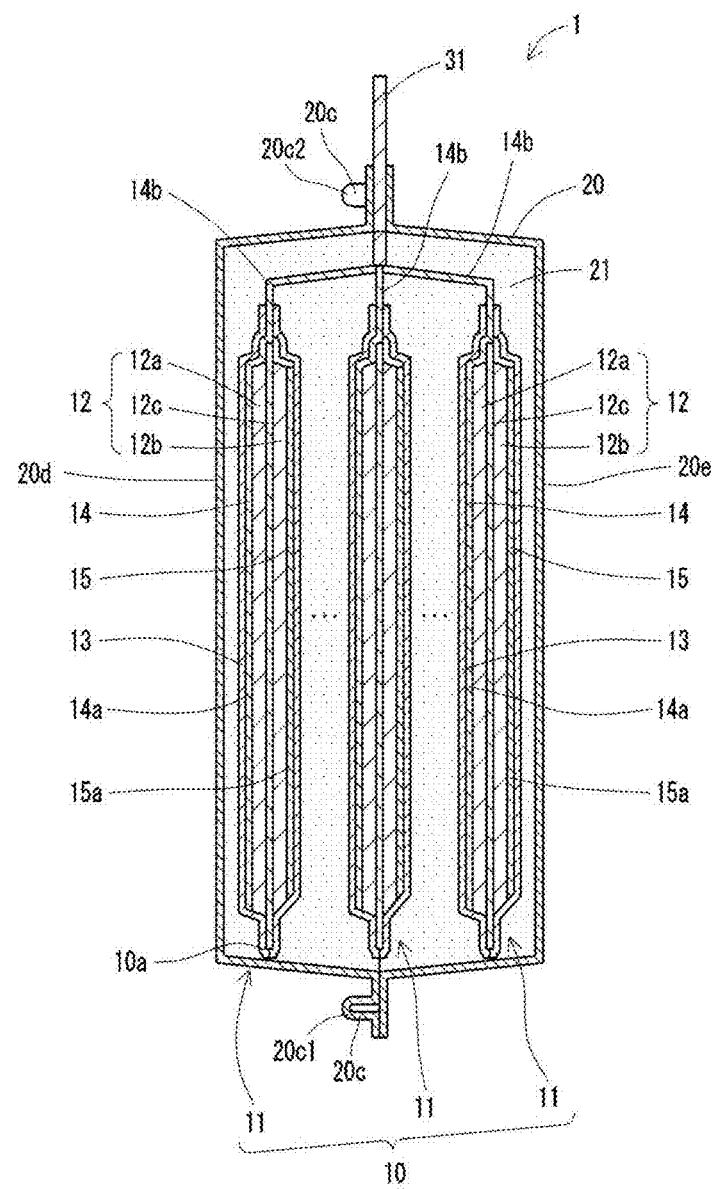
FIG. 2 is a cross-sectional view of the electrochemical cell taken along line A-A in FIG. 1.
Figure 3:
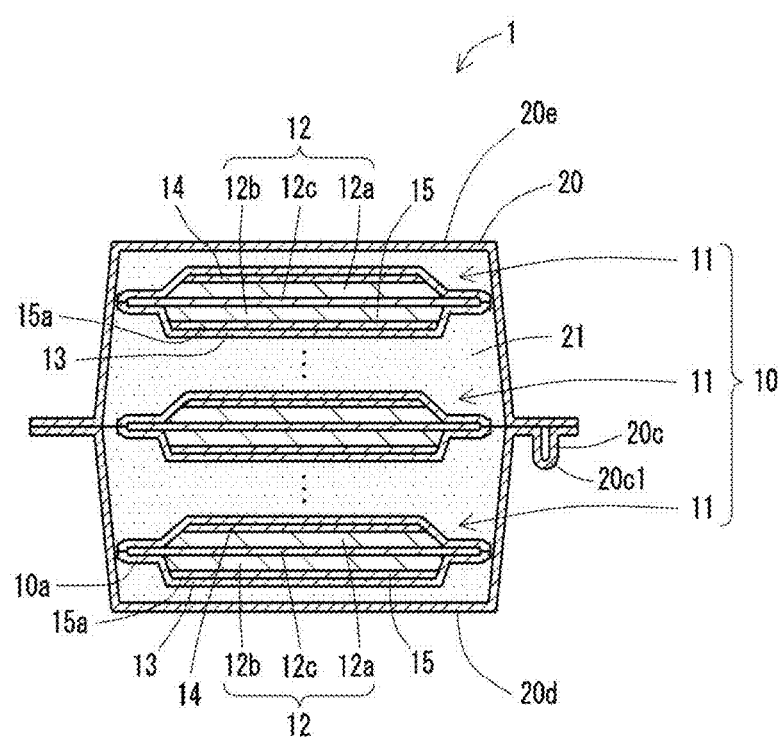
FIG. 3 is a cross-sectional view of the electrochemical cell taken along line B-B in FIG. 1.
Figure 4:
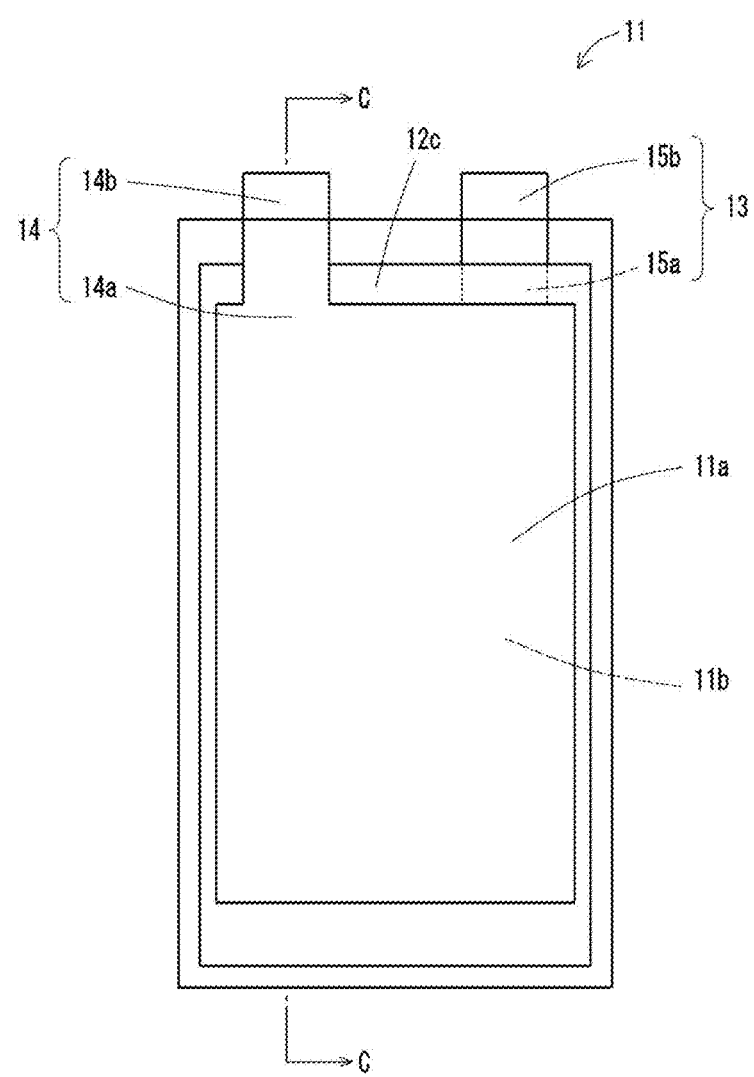
FIG. 4 is a plan view of a unit cell included in the electrochemical cell in FIG. 1.
Figure 5:
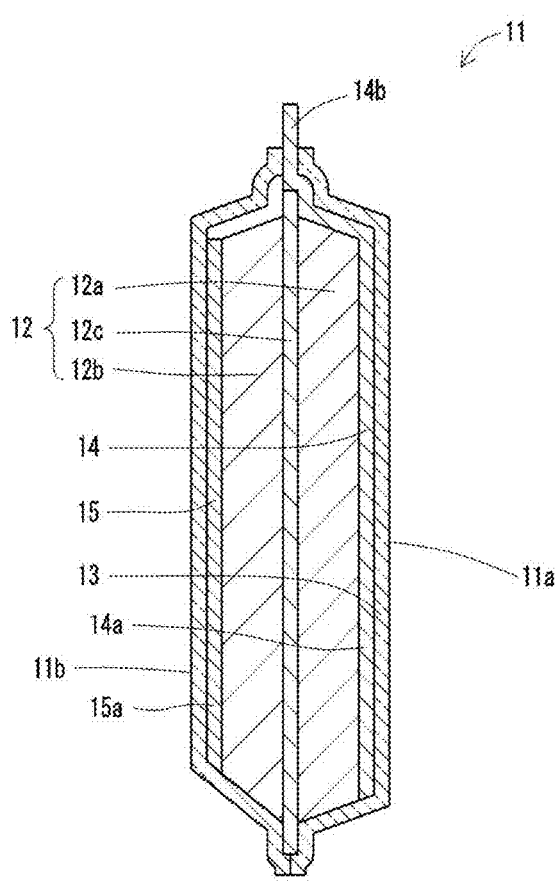
FIG. 5 is a cross-sectional view of the unit cell taken along line C-C in FIG. 4.

FIG. 1 is a plan view of an example electrochemical cell according to an embodiment of the present disclosure. FIG. 2 is a cross-sectional view of the electrochemical cell taken along line A-A in FIG. 1. FIG. 3 is a cross-sectional view of the electrochemical cell taken along line B-B in FIG. 1. FIG. 4 is a plan view of a unit cell included in the electrochemical cell in FIG. 1. FIG. 5 is a cross-sectional view of the unit cell taken along line C-C in FIG. 4.

An electrochemical cell 1 according to the present embodiment includes a cell stack 10 and an outer case 20. The cell stack 10 is a stack of multiple unit cells 11. The unit cell 11 is a plate. The unit cell 11 is the smallest unit member functioning as a battery in the electrochemical cell 1.

The unit cell 11 has a first main surface 11a and a second main surface 11b opposite to the first main surface 11a. The unit cell 11 may be, for example, rectangular, square, circular, oval, or in any other shape as viewed in the stacking direction (the lateral direction in FIG. 2, or hereafter simply a first direction) of the cell stack 10. The unit cell 11 in the present embodiment is, as shown in FIG. 4 for example, substantially rectangular as viewed in the first direction. The unit cell 11 has, for example, a long side of 50 to 500 mm and a short side of 50 to 300 mm as viewed in the first direction. The unit cell 11 has a thickness of, for example, 0.1 to 2 mm in the first direction.

The unit cell 11 includes an electricity generator 12, a package 13, a positive electrode terminal 14, and a negative electrode terminal 15. The electricity generator 12 charges and discharges through an electrochemical reaction. The electricity generator 12 includes, for example, a positive electrode 12a, a negative electrode 12b, and a separator 12c between the positive electrode 12a and the negative electrode 12b. The electricity generator 12 can exchange cations and anions between the positive electrode 12a and the negative electrode 12b through the separator 12c. The electricity generator 12 with the positive electrode 12a and the negative electrode 12b electrically connected to an external device can supply electricity to the external device.

The positive electrode 12a and the negative electrode 12b are, for example, electrochemically active. The positive electrode 12a and the negative electrode 12b may include, for example, an active material and an electrolyte. The electrolyte may be, for example, a solvent containing salt or a solvent mixture containing salt.

The positive electrode 12a may contain, for example, lithium nickel cobalt aluminum oxide (NCA), lithium manganese oxide spinel (LMO), lithium iron phosphate (LFP), lithium cobalt oxide (LCO), and lithium nickel cobalt manganese oxide (NCM). The positive electrode 12a may contain, for example, solid-state compounds used for, for example, nickel metal hydride batteries and nickel-cadmium batteries as known to those skilled in the art. The positive electrode 12a may contain, for example, magnesium (Mg)-doped $LiCoO_2$ and $LiNiO_2$.

The negative electrode 12b may contain, for example, carbon-based materials such as graphite, hard carbon, soft carbon, carbon nanotubes, and graphene. The negative electrode 12b may contain, for example, titanium oxide such as lithium titanate and titanium dioxide. The negative electrode 12b may contain, for example, a transition metal compound containing, for example, iron, cobalt, copper, manganese, or nickel.

When the electrochemical cell 1 is a lithium-ion battery, the electrolyte may be, for example, a solvent containing lithium salt. Examples of lithium salt contained in the electrolyte include $LiPF_6$, $LiBF_4$, $LiClO_4$, and LiFSI. Examples of the solvent contained in the electrolyte include propylene carbonate (PC), ethylene carbonate (EC), dimethyl carbonate (DMC), dimethoxyethane (DME), diethyl carbonate (DEC), tetrahydrofuran (THF), and triethylene glycol dimethyl ether (triglyme).

The separator 12c reduces the likelihood of a short circuit between the positive electrode 12a and the negative electrode 12b. For example, the separator 12c may have pores for passage of cations and anions. The separator 12c may be formed from, for example, a porous insulator. Examples of the porous insulator used for the separator 12c include polyolefin and polyvinyl chloride.

The electricity generator 12 may be, for example, rectangular, square, circular, oval, or in any other shape as viewed in the first direction. In the present embodiment, the electricity generator 12 is, as shown in FIG. 4 for example, rectangular as viewed in the first direction. The electricity generator 12 has, for example, a long side of 50 to 500 mm and a short side of 50 to 300 mm as viewed in the first direction. The electricity generator 12 has a thickness of, for example, 0.1 to 2 mm in the first direction.

In the present embodiment, the multiple unit cells 11 are electrically connected to one another in parallel. This can increase the capacity of the electrochemical cell 1. The multiple unit cells 11 may be electrically connected to one another in series. This can increase the voltage across the electrochemical cell 1.

The package 13 electrically insulates the electricity generator 12 from the external environment to protect the electricity generator 12 from the external environment. The package 13 entirely covers and accommodates the electricity generator 12. The package 13 is, for example, a flat bag. The package 13 may be formed by, for example, welding two laminated films together. The package 13 is formed from, for example, a laminated film shaped into a flat bag. The package 13 may be, for example, rectangular, square, or in any other shape as viewed in the first direction. In the present embodiment, the package 13 is, as shown in FIG. 4 for example, rectangular as viewed in the first direction.

The package 13 includes, for example, an insulator. This can reduce the likelihood of a short circuit between the external environment and the electricity generator 12 through the package 13, protecting the electricity generator 12 from the external environment. The package 13 includes, for example, a resin material. The resin material may be, for example, polyethylene terephthalate or polyethylene. Thus, the electricity generator 12 is less likely to be in contact with oxygen and moisture contained in the atmosphere, protecting the electricity generator 12 from the external environment.

The package 13 may be, for example, multilayered. The package 13 includes, for example, a thermally adhesive resin material and a heat-resistant resin material. The thermally adhesive resin material melts, for example, at temperatures lower than 150° C. The thermally adhesive resin material may be, for example, polyethylene or polypropylene. The heat-resistant resin material melts, for example, at 150 to 300° C. inclusive. The heat-resistant resin material may be, for example, polyethylene terephthalate or polyethylene naphthalate.

Through the positive electrode terminal 14 and the negative electrode terminal 15, electricity charged in the electricity generator 12 is output from the package 13. The positive electrode terminal 14 and the negative electrode terminal 15 extend from the inside to the outside of the package 13.

The positive electrode terminal 14 is electrically connected to the positive electrode 12a. The positive electrode terminal 14 is electrically insulated from the negative electrode 12b and the negative electrode terminal 15. The positive electrode terminal 14 is formed from, for example, a metal material. The metal material used for the positive electrode terminal 14 may be, for example, aluminum.

The positive electrode terminal 14 includes a first positive electrode terminal portion 14a inside the package 13, and a second positive electrode terminal portion 14b outside the package 13. The first positive electrode terminal portion 14a is in contact with the positive electrode 12a. The first positive electrode terminal portion 14a is located between the package 13 and the positive electrode 12a. The second positive electrode terminal portion 14b is connected to a connection terminal of the electrochemical cell 1. The second positive electrode terminal portion 14b may be, for example, a rectangular or square plate, or in any other shape. In the present embodiment, the second positive electrode terminal portion 14b is, as shown in FIG. 4 for example, rectangular as viewed in the first direction. The second positive electrode terminal portion 14b has, for example, a long side of 30 to 100 mm and a short side of 10 to 100 mm as viewed in the first direction. The second positive electrode terminal portion 14b has a thickness of, for example, 3 to 30 µm in the first direction.

The negative electrode terminal 15 is electrically connected to the negative electrode 12b. The negative electrode terminal 15 is electrically insulated from the positive electrode 12a and the positive electrode terminal 14. The negative electrode terminal 15 is formed from, for example, a metal material. The metal material used for the negative electrode terminal 15 may be, for example, copper.

The negative electrode terminal 15 includes a first negative electrode terminal portion 15a inside the package 13, and a second negative electrode terminal portion 15b outside the package 13. The first negative electrode terminal portion 15a is in contact with the negative electrode 12b. The first negative electrode terminal portion 15a is located between the package 13 and the negative electrode 12b. The second negative electrode terminal portion 15b is connected to the connection terminal of the electrochemical cell 1. The second negative electrode terminal portion 15b may be, for example, a rectangular or square plate, or in any other shape. In the present embodiment, the second negative electrode terminal portion 15b is, as shown in FIG. 4 for example, rectangular as viewed in the first direction. The second negative electrode terminal portion 15b has, for example, a long side of 30 to 100 mm and a short side of 10 to 100 mm as viewed in the first direction. The second negative electrode terminal portion 15b has a thickness of, for example, 3 to 30 μm in the first direction.

The second positive electrode terminal portion 14b and the second negative electrode terminal portion 15b may, as shown in FIG. 4 for example, extend outward from one side of the package 13 as viewed in the first direction. The second positive electrode terminal portion 14b and the second negative electrode terminal portion 15b may extend outward from different sides of the package 13 as viewed in the first direction.

The outer case 20 protects the cell stack 10 from the external environment. The external environment includes, for example, oxygen and moisture in the air. The outer case 20 entirely covers and accommodates the cell stack 10. The outer case 20 may be, for example, a cylinder, a bag, or in any other shape. The outer case 20 may be formed by, for example, welding two members together into a bag. The outer case 20 may be formed from, for example, a single member shaped into a bag. The outer case 20 may be, for example, rectangular, square, or in any other shape as viewed in the first direction. In the present embodiment, the outer case 20 is, as shown in FIG. 1 for example, rectangular as viewed in the first direction. The outer case 20 has its long-side and short-side directions substantially corresponding to the long-side and short-side directions of the cell stack 10 as viewed in the first direction. The outer case 20 may have, for example, a long side of 50 to 600 mm and a short side of 50 to 400 mm as viewed in the first direction. The outer case 20 has its portion overlapping the cell stack 10 with a thickness of, for example, 50 to 300 μm as viewed in the first direction.

The electrochemical cell 1 includes a connection terminal 30. Through the connection terminal 30, the electricity charged in the cell stack 10 is output from the outer case 20. The connection terminal 30 includes a first connection terminal 31 and a second connection terminal 32. The first connection terminal 31 and the second connection terminal 32 extend from the inside to the outside of the outer case 20. The first connection terminal 31 has its portion located inside the outer case 20 and bonded to the multiple positive electrode terminals 14 connected to one another. The second connection terminal 32 has its portion located inside the outer case 20 and bonded to the multiple negative electrode terminals 15 connected to one another. The first connection terminal 31 and the second connection terminal 32 include, for example, a metal material. Examples of the metal material for the first connection terminal 31 and the second connection terminal 32 include copper and aluminum.

The outer case 20 includes, for example, an insulator. This can reduce the likelihood of a short circuit between the external environment and the cell stack 10 through the outer case 20, protecting the cell stack 10 from the external environment. The insulator may be, for example, a resin material such as polyethylene terephthalate and polyethylene.

The outer case 20 may be, for example, multilayered. The outer case 20 may be, for example, three-layered. The outer case 20 may include, for example, a first insulating layer, a moisture-proof layer, and a second insulating layer. The moisture-proof layer is located between the first insulating layer and the second insulating layer. The moisture-proof layer may be covered with the first insulating layer and the second insulating layer. The moisture-proof layer may be in direct contact with the first insulating layer and the second insulating layer.

The first insulating layer may be the outermost layer of the three layers in the outer case 20. The first insulating layer may include a resin material such as polyethylene terephthalate and polyethylene naphthalate. The moisture-proof layer reduces the likelihood that oxygen or moisture penetrating the first insulating layer reaches the second insulating layer. The moisture-proof layer may include a metal material, for example, copper or aluminum. The second insulating layer may include a resin material such as polyethylene and polypropylene.

The outer case 20 may include a liquid layer 21 to transmit external pressure to the unit cells 11. The liquid layer 21 is located between two adjacent unit cells 11. The liquid layer 21 may be in direct contact with the two adjacent unit cells 11. Although the unit cells 11 each may have recesses on its first main surface 11a and its second main surface 11b, the liquid layer 21 may be located inside the recesses to allow pressure to be applied uniformly to the two adjacent unit cells 11. In other words, this structure allows the two adjacent unit cells 11 to perform charging and discharging reactions without varying interface resistances. The unit cells 11 are thus less likely to deteriorate. Each electrochemical cell 1 can thus have a longer service life.

The liquid layer 21 may be located, as shown in FIGS. 2 and 3 for example, between the cell stack 10 and the outer case 20. Such a cell stack 10 is thus less likely to be misaligned in the outer case 20. This reduces the likelihood of damage at the joint between the connection terminal 30 and the positive electrode terminals 14 or between the connection terminal 30 and the negative electrode terminals 15.

The liquid layer 21 may be, for example, an organic solvent. Examples of the organic solvent used for the liquid layer 21 include ethylene carbonate and γ-butyrolactone. The liquid layer 21 may also be formed from, for example, a flowable low-molecular-weight polymer material such as polyethylene oxide. The liquid layer 21 may also be formed from a silicon-based polymer material such as silicone.

The liquid layer 21 may be formed from, for example, a water-absorbent material such as a water-absorbent polymer. The liquid layer 21 can thus absorb moisture entering the outer case 20 and reduce entry of moisture into the unit cells 11. Each electrochemical cell 1 can thus have a longer service life. The water-absorbent polymer used for the liquid layer 21 may be, for example, polyacrylonitrile.

The liquid layer 21 may include, for example, an inorganic material such as a porous filler. The liquid layer 21 can thus absorb moisture entering the outer case 20 and reduce entry of moisture into the unit cells 11. Each electrochemical cell 1 can thus have a longer service life. The porous filler used for the liquid layer 21 may be, for example, zeolite.

The liquid layer 21 may include a metal filler reactable with oxygen and water. Oxygen and water entering the outer case 20 may react with the metal filler and thus are less likely to enter the unit cells 11. Each electrochemical cell 1 can thus have a longer service life. Examples of the metal filler used for the liquid layer 21 include iron, copper, and aluminum.

The liquid layer 21 may include a material having higher thermal conductivity than an electrolyte used in the electricity generator 12. This facilitates transfer of heat generated in the unit cells 11 to the liquid layer 21. The unit cells 11 are thus less likely to accumulate heat. Each electrochemical cell 1 can thus have a longer service life.

The liquid layer 21 may include a material having higher viscosity than the electrolyte used in the electricity generator 12. The cell stack 10 is thus less likely to be misaligned in the outer case 20. This reduces the likelihood of damage at the joint between the connection terminal 30 and the positive electrode terminals 14 or between the connection terminal 30 and the negative electrode terminals 15. Each electrochemical cell 1 can thus have a longer service life.

In the electrochemical cell 1 in the embodiment, as shown in FIGS. 1 to 3 for example, the outer case 20 includes at least one rib 20c. The rib 20c is located, as shown in FIG. 1 for example, on a surface area 20b between an outer edge 20a of the outer case 20 and an outer periphery 10a of the cell stack 10 in the outer case 20 as viewed in the first direction. The rib 20c is a portion of the surface area 20b protruding outward. The rib 20c may not protrude in the first direction. The rib 20c may protrude in a direction intersecting with the first direction. The rib 20c may be located either on a first main surface 20d or on a second main surface 20e of the outer case 20. The rib 20c may be located both on the first main surface 20d and on the second main surface 20e of the outer case 20.

The outer case 20 including the rib 20c may be formed, for example, with the method described below. An enclosure to be the outer case 20 as a bag with at least one opening is prepared first. A rib precursor protruding, for example, outward at a predetermined position is formed on the enclosure. The cell stack 10, the liquid layer 21, and other components are then arranged inside the enclosure. The enclosure is then evacuated. In this state, the outer case 20 having the rib 20c is formed by welding the opening of the enclosure.

In the electrochemical cell 1, the outer case 20 including a rib 20c is less likely to deform upon, for example, receiving an impact. Thus, the cell stack 10 is less likely to be misaligned in the outer case 20, and the unit cells 11 are less likely to be misaligned from one another in the cell stack 10. This reduces the likelihood of damage at the joint between the connection terminal 30 and the positive electrode terminals 14 or between the connection terminal 30 and the negative electrode terminals 15, increasing the durability of the electrochemical cell 1.

The rib 20c may include, as shown in FIG. 1 for example, a rib 20c1 extending along the outer periphery 10a of the cell stack 10. The outer case 20 with the rib 20c1 is further less likely to deform upon, for example, receiving an impact. Thus, the cell stack 10 is further less likely to be misaligned in the outer case 20, and the unit cells 11 are further less likely to be misaligned from one another in the cell stack 10. This reduces the likelihood of damage at the joint between the connection terminal 30 and the positive electrode terminals 14 or between the connection terminal 30 and the negative electrode terminals 15, increasing the durability of the electrochemical cell 1.

The rib 20c may include, as shown in FIG. 1 for example, a rib 20c2 extending along the corner of the outer periphery 10a. The outer case 20 in the electrochemical cell 1 is susceptible, at its corner of the outer edge 20a, to an impact during, for example, transportation or assembly of an electrochemical cell module. As shown in FIG. 1 for example, the outer case 20 with the rib 20c2 along the corner of the outer periphery 10a inward from the corner of the outer edge 20a is further less likely to deform upon for example, receiving an impact. Thus, the cell stack 10 is further less likely to be misaligned in the outer case 20, and the unit cells 11 are further less likely to be misaligned from one another in the cell stack 10. This reduces the likelihood of damage at the joint between the connection terminal 30 and the positive electrode terminals 14 or between the connection terminal 30 and the negative electrode terminals 15, increasing the durability of the electrochemical cell 1.

The ribs 20c2 may be located on the four corners of the outer periphery 10a. The outer case 20 is thus further less likely to deform upon, for example, receiving an impact. Thus, the cell stack 10 is further less likely to be misaligned in the outer case 20, and the unit cells 11 are further less likely to be misaligned from one another in the cell stack 10. This reduces the likelihood of damage at the joint between the connection terminal 30 and the positive electrode terminals 14 or between the connection terminal 30 and the negative electrode terminals 15, increasing the durability of the electrochemical cell 1.

The rib 20c may include a rib 20c3 extending from the corner of the outer periphery 10a of the cell stack 10 to the outer edge 20a of the outer case 20. The outer case 20 with the rib 20c3 is further less likely to deform upon, for example, receiving an impact. Thus, the cell stack 10 is further less likely to be misaligned in the outer case 20, and the unit cells 11 are further less likely to be misaligned from one another in the cell stack 10. This reduces the likelihood of damage at the joint between the connection terminal 30 and the positive electrode terminals 14 or between the connection terminal 30 and the negative electrode terminals 15, increasing the durability of the electrochemical cell 1.

The rib 20c may extend fully along the outer periphery 10a. The outer case 20 with the rib 20c is further less likely to deform upon, for example, receiving an impact. Thus, the cell stack 10 is further less likely to be misaligned in the outer case 20, and the unit cells 11 are further less likely to be misaligned from one another in the cell stack 10. This reduces the likelihood of damage at the joint between the connection terminal 30 and the positive electrode terminals 14 or between the connection terminal 30 and the negative electrode terminals 15, increasing the durability of the electrochemical cell 1.

Figure 6:
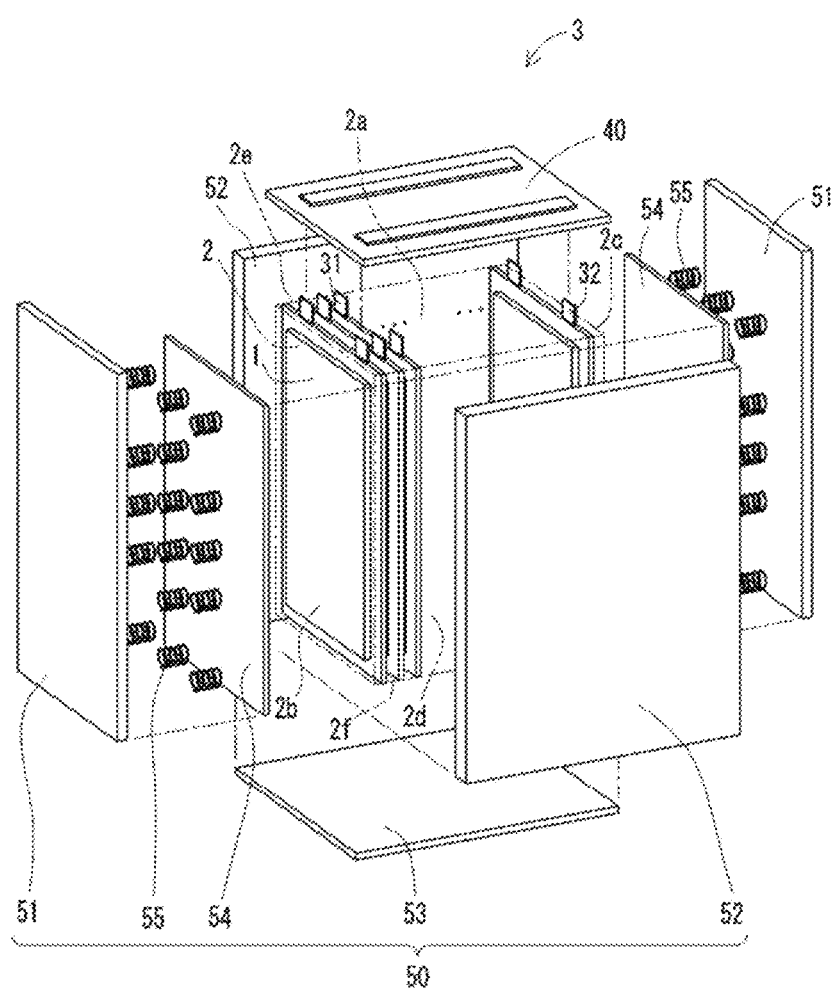
FIG. 6 is an exploded perspective view of an example electrochemical cell module according to an embodiment of the present disclosure.

An electrochemical cell module according to one or more embodiments of the present disclosure will now be described. FIG. 6 is an exploded perspective view of an example electrochemical cell module according to an embodiment of the present disclosure.

An electrochemical cell module 3 according to the present embodiment includes multiple electrochemical cells 1, a current collector 40, and a housing 50.

The multiple electrochemical cells 1 are stacked on one another in a predetermined second direction. The multiple electrochemical cells 1 are stacked on one another with their profiles substantially in conformance with one another as viewed in the second direction, forming an electrochemical cell stack 2. The electrochemical cell stack 2 is, as shown in FIG. 6 for example, substantially rectangular. The multiple electrochemical cells 1 each include the first connection terminal 31 and the second connection terminal 32 protruding from an upper surface 2a of the electrochemical cell stack 2.

The current collector 40 electrically connects the multiple electrochemical cells 1 to one another. The current collector 40 may electrically connect the multiple electrochemical cells 1 in parallel. In other words, the current collector 40 may electrically connect the first connection terminals 31 of the multiple electrochemical cells 1 together, and the second connection terminals 32 of the multiple electrochemical cells 1 together. This can increase the capacity of the electrochemical cell module 3.

To electrically connect the multiple electrochemical cells 1 in series, the current collector 40 may electrically connect the first connection terminals 31 and the second connection terminals 32 of the multiple electrochemical cells 1 to form a series connection. This can increase the voltage across the electrochemical cell module 3.

The housing 50 accommodates the electrochemical cell stack 2 (multiple electrochemical cells 1) and protects the electrochemical cell stack 2 from the external environment. The housing 50 may protect the electrochemical cell stack 2 against an external force from the external environment. In the present embodiment, the housing 50 may be, as shown in FIG. 6 for example, a rectangular box open at one surface. The housing 50 may include, for example, a single part shaped into a rectangular prism open at one surface. The housing 50 may also include, for example, two or more parts combined together.

The housing 50 may include, for example, a metal material. Such a housing 50 has higher rigidity and reduces transmission of any external force from the external environment to the electrochemical cell stack 2. The housing 50 thus protects the electrochemical cell stack 2 from the external environment. The metal material used for the housing 50 may be, for example, aluminum or stainless steel. This facilitates transfer of heat generated in the electrochemical cell stack 2 to the housing 50. The electrochemical cell stack 2 is thus less likely to accumulate heat. Each electrochemical cell 1 can thus have a longer service life.

The housing 50 may include, for example, multiple parts. The multiple parts may include, for example, two main surface plates 51, two side plates 52, and a bottom plate 53. The main surface plates 51, the side plates 52, and the bottom plate 53 may include a metal material and a resin material.

The two main surface plates 51 protect end faces 2b and 2c of the electrochemical cell stack 2 in the second direction. The two main surface plates 51 face the respective end faces 2b and 2c of the electrochemical cell stack 2. The main surface plates 51 may be rectangular as viewed in the second direction. In this case, the main surface plates 51 may have, for example, a long side of 200 to 600 mm and a short side of 50 to 300 mm. The main surface plates 51 may have, for example, a thickness of 0.5 to 5 mm.

The main surface plates 51 may include, for example, a metal material. Examples of the metal material used for the main surface plates 51 include aluminum and stainless steel. This facilitates transfer of heat generated in the electrochemical cells 1 outside through the main surface plates 51. Each electrochemical cell 1 can thus have a longer service life.

The main surface plates 51 may include, for example, a resin material. The resin material used for the main surface plates 51 may be, for example, a heat-resistant resin material such as polyethylene terephthalate (PET). Such main surface plates 51 can electrically insulate the electrochemical cells 1 from the external environment, thus reducing the likelihood of a short circuit between the electrochemical cells 1 and the external environment. Each electrochemical cell 1 can thus have a longer service life.

The two side plates 52 protect side surfaces 2d and 2e each connected to the upper surface 2a of the electrochemical cell stack 2 and parallel to the second direction. The two side plates 52 face the respective side surfaces 2d and 2e of the electrochemical cell stack 2.

The side plates 52 may be in contact with at least one of the side surfaces 2d or 2e of the electrochemical cell stack 2. This facilitates transfer of heat generated in the electrochemical cells 1 outside through the side plates 52. Each electrochemical cell 1 can thus have a longer service life. Although at least one of the side plates 52 is in contact with either the side surface 2d or the side surface 2e of the electrochemical cell stack 2, the electrochemical cell module 3 in the present embodiment including the electrochemical cells 1 in the above embodiment can reduce the likelihood of deformation of the outer case 20 and of misalignment of the cell stack 10 in the outer case 20. The electrochemical cells 1 are thus less likely to have lower durability.

The side plates 52 may be rectangular as viewed in a direction perpendicular to the side surfaces 2d and 2e of the electrochemical cell stack 2. In this case, the side plates 52 may have, for example, a long side of 200 to 600 mm and a short side of 50 to 300 mm. The side plates 52 may have, for example, a thickness of 0.5 to 5 mm.

The side plates 52 may include, for example, a metal material. Examples of the metal material used for the side plates 52 include aluminum and stainless steel. This facilitates transfer of heat generated in the electrochemical cells 1 outside through the side plates 52. Each electrochemical cell 1 can thus have a longer service life.

The side plates 52 may include, for example, a resin material. The resin material used for the side plates 52 may be, for example, a heat-resistant resin material such as PET. Such side plates 52 can electrically insulate the electrochemical cells 1 from the external environment, thus reducing the likelihood of a short circuit between the electrochemical cells 1 and the external environment. Each electrochemical cell 1 can thus have a longer service life.

The bottom plate 53 protects a lower surface 2f opposite to the upper surface 2a of the electrochemical cell stack 2. The bottom plate 53 may be, for example, bent parts of the main surface plates 51 or the side plates 52.

The bottom plate 53 may be in contact with the lower surface 2f opposite to the upper surface 2a of the electrochemical cell stack 2. This facilitates transfer of heat generated in the electrochemical cells 1 outside through the bottom plate 53. Each electrochemical cell 1 can thus have a longer service life. Although the bottom plate 53 is in contact with the lower surface 2f of the electrochemical cell stack 2, the electrochemical cell module 3 in the present embodiment including the electrochemical cells 1 in the above embodiment can reduce the likelihood of deformation of the outer case 20 and of misalignment of the cell stack 10 in the outer case 20. The electrochemical cells 1 are thus less likely to have lower durability.

The bottom plate 53 may be rectangular as viewed in a direction perpendicular to the lower surface 2f of the electrochemical cell stack 2. In this case, the bottom plate 53 may have, for example, a long side of 200 to 600 mm and a short side of 50 to 300 mm. The bottom plate 53 may have, for example, a thickness of 0.5 to 5 mm.

The bottom plate 53 may include, for example, a metal material. Examples of the metal material used for the bottom plate 53 include aluminum and stainless steel. This facilitates transfer of heat generated in the electrochemical cells 1 outside through the bottom plate 53. Each electrochemical cell 1 can thus have a longer service life.

The bottom plate 53 may include, for example, a resin material. The resin material used for the bottom plate 53 may be, for example, a heat-resistant resin material such as PET. Such a bottom plate 53 can electrically insulate the electrochemical cells 1 from the external environment, thus reducing the likelihood of a short circuit between the electrochemical cells 1 and the external environment. Each electrochemical cell 1 can thus have a longer service life.

The electrochemical cell stack 2 may be held with their end faces 2b and 2c in the second direction pressed in the housing 50. The electrochemical cell stack 2 may be pressed and held by pressure plates 54 and elastic members 55.

The pressure plates 54 may be formed from, for example, a metal material. This facilitates transfer of heat generated in the electrochemical cells 1 outside. Each electrochemical cell 1 can thus have a longer service life. Examples of the metal material used for the pressure plates 54 include aluminum and stainless steel.

The pressure plates 54 may also be formed from, for example, an insulating resin material. Such pressure plates 54 can electrically insulate the electrochemical cells 1 from the external environment, thus reducing the likelihood of a short circuit between the electrochemical cells 1 and the external environment. The resin material used for the pressure plates 54 may be, for example, a thermosetting resin such as an epoxy resin, a phenolic resin, or a melamine resin.

The pressure plates 54 may also be formed from, for example, both a resin material and a metal material. The resin material may be used for portions of the pressure plates 54 in contact with the electrochemical cell stack 2. Such portions can electrically insulate the electrochemical cells 1 from the pressure plates 54, thus reducing the likelihood of a short circuit between the electrochemical cells 1 and the external environment. The pressure plates 54 including a metal material are less likely to be damaged.

The elastic members 55 are located between the pressure plates 54 and the main surface plates 51 of the housing 50. The elastic members 55 apply pressure to the pressure plates 54 to apply pressure to the electrochemical cells 1. The elastic members 55 may be, for example, springs. The springs may be, for example, helical. The springs may be, for example, bent plates. The springs may include, for example, a metal material. Examples of the metal material used for the springs include steel and stainless steel. The helical springs may have, for example, a diameter of 5 to 50 mm, a length of 10 to 50 mm, and a pitch of 1 to 10 mm.

The elastic members 55 may be, for example, a rubber material shaped into plates. The rubber plates may have, for example, the same shape as the pressure plates 54. The rubber material may be, for example, natural rubber or synthetic rubber.

The electrochemical cell stack 2 may have their end faces 2b and 2c in the second direction receiving pressure applied by the housing 50. The housing 50 may apply pressure to the end faces 2b and 2c of the electrochemical cell stack 2 with, for example, their main surface plates 51 fastened to the side plates 52 with screws to press the end faces 2b and 2c of the electrochemical cell stack 2.

The electrochemical cell module 3 including the electrochemical cells 1 can achieve an electrochemical cell module with higher durability. In addition, the electrochemical cell module 3 including the housing 50 with higher rigidity may reduce transmission of any external force from the external environment to the electrochemical cells 1. Such an electrochemical cell module can have still higher durability.

Electrochemical Cell System

An electrochemical cell system according to an embodiment of the present disclosure includes the electrochemical cell module in the above embodiment, and a controller to control the electrochemical cell module. The controller may be a control integrated circuit (IC) incorporated in the electrochemical cell module to protect a battery from overcharge and over-discharge. The control IC may include a protection circuit as a program.

In response to the battery voltage exceeding a preset fully charged battery voltage, the protection circuit forcibly stops the flow of a charging current. In response to a battery voltage during discharge being less than a preset dischargeable voltage, the protection circuit forcibly stops discharging the current. Such sudden power shutdown due to the operation of the protection circuit can greatly affect facilities (power receivers) receiving power from the electrochemical cell module. To avoid such a situation, in response to the battery voltage decreasing to the dischargeable voltage, a user may receive warning information such as a message stating "Low battery. Charge now." on a display, with a sound, or in any other manner. In response to the warning signal, the user stores data into, for example, a memory and then stops the facility.

The protection circuit implements a charging sequence including, for example, pre-charging, quick charging or constant-current charging, constant-voltage charging, and determining that the battery is fully charged in this order. In the pre-charging, a small amount of current flows in the battery first. In response to the battery reaching a constant voltage, charging with a constant current (constant-current charging) is performed. In this manner, constant-voltage constant-current (CVCC) control shifts the constant current to the constant voltage. In response to the battery voltage increasing substantially to a fully charged voltage, the protection circuit performs charging at a constant voltage. During the constant-voltage charging, the charging current naturally decreases as the internal voltage of the battery increases. In response to the current value decreasing to a constant current value, the protection circuit determines that the charging is complete and thus stops charging.

The present disclosure may be implemented in the following forms.

An electrochemical cell according to one or more embodiments of the present disclosure includes a cell stack including a plurality of unit cells stacked on one another and each being a plate and including an electricity generator and a casing accommodating the electricity generator, and an outer case accommodating the cell stack. The outer case includes at least one rib in a surface area between an outer edge of the outer case and an outer periphery of the cell stack as viewed in a stacking direction of the cell stack. The at least one rib is a portion of the surface area protruding outward.

An electrochemical cell module according to one or more embodiments of the present disclosure includes a plurality of the above electrochemical cells, a current collector electrically connecting the plurality of electrochemical cells to one another, and a housing accommodating the plurality of electrochemical cells.

An electrochemical cell system according to one or more embodiments of the present disclosure includes at least one electrochemical cell module, and a controller that controls the electrochemical cell module.

The electrochemical cells according to one or more aspects of the present disclosure can reduce the likelihood of deformation of the outer case and misalignment of the cell stack in the outer case. The electrochemical cells can thus have higher durability. The electrochemical cell module according to one or more aspects of the present disclosure including the electrochemical cells described above and the electrochemical cell system including the electrochemical cell module can have higher durability.

Although embodiments of the present disclosure have been described in detail, the present disclosure is not limited to the embodiments described above, and may be changed or modified in various manners without departing from the spirit and scope of the present disclosure. The components described in the above embodiments may be entirely or partially combined as appropriate unless any contradiction arises.

REFERENCE SIGNS LIST 1 electrochemical cell
2 electrochemical cell stack
2a upper surface
2b, 2c end face
2d, 2e side surface
2f lower surface
3 electrochemical cell module
10 cell stack
10a outer periphery
11 unit cell
11a first main surface
11b second main surface
12 electricity generator
12a positive electrode
12b negative electrode
12c separator
13 package
14 positive electrode terminal
14a first positive electrode terminal portion
14b second positive electrode terminal portion
15 negative electrode terminal
15a first negative electrode terminal portion
15b second negative electrode terminal portion
20 outer case
20a outer edge
20b surface area
20c, 20c1, 20c2, 20c3 rib
20d first main surface
20e second main surface
21 liquid layer
30 connection terminal
31 first connection terminal
32 second connection terminal
40 current collector
50 housing
51 main surface plate
52 side plate
53 bottom plate
54 pressure plate
55 elastic member

The invention claimed is:

1. An electrochemical cell, comprising:
a cell stack including a plurality of unit cells stacked on one another in a stacking direction of the cell stack, each of the plurality of unit cells having a plate shape and including an electricity generator and a casing accommodating the electricity generator; and
an outer case accommodating the cell stack, the outer case including an outer layer having a folded portion located in a surface area of the outer layer between an outer edge of the outer case and an outer periphery of the cell stack in a direction perpendicular to the stacking direction, the folded portion of the outer layer defining at least one rib protruding outward in the stacking direction from the surface area of the outer layer.

2. The electrochemical cell according to claim 1, wherein the at least one rib includes a rib extending along the outer periphery of the cell stack.

3. The electrochemical cell according to claim 1, wherein the cell stack is rectangular as viewed in the stacking direction, and
the at least one rib includes a rib extending along a corner of the outer periphery of the cell stack.

4. The electrochemical cell according to claim 3, wherein the at least one rib includes four ribs, and each of the four ribs extends along a corresponding corner of four corners of the outer periphery of the cell stack.

5. The electrochemical cell according to claim 3, wherein the at least one rib includes a further rib extending from the corner of the outer periphery of the cell stack towards the outer edge of the outer case.

6. The electrochemical cell according to claim 1, wherein the at least one rib includes a rib extending along an entirety of the outer periphery of the cell stack.

7. The electrochemical cell according to claim 1, wherein the electricity generator includes a positive electrode, a negative electrode, and a separator located between the positive electrode and the negative electrode.

8. The electrochemical cell according to claim 5, wherein the further rib extends from the corner of the outer periphery of the cell stack towards a corner of the outer edge of the outer case.

9. The electrochemical cell according to claim 1, wherein the outer case is a bag having first and second members welded to each other.

10. The electrochemical cell according to claim 1, wherein
the outer case is a single member shaped in a bag.

11. The electrochemical cell according to claim 1, wherein
the outer layer of the outer case is an insulating layer including a resin material.

12. The electrochemical cell according to claim 1, wherein
the outer layer of the outer case has a first main surface and a second main surface opposite to the first main surface in the stacking direction, and
the at least one rib is located on at least one of the first main surface or the second main surface.

13. The electrochemical cell according to claim 12, wherein
the at least one rib is located on both of the first main surface and the second main surface.

14. An electrochemical cell module, comprising:
a plurality of electrochemical cells;
a current collector electrically connecting the plurality of electrochemical cells to one another; and
a housing accommodating the plurality of electrochemical cells,
wherein each of the plurality of electrochemical cells includes:
a cell stack including a plurality of unit cells stacked on one another in a stacking direction of the cell stack, each of the plurality of unit cells having a plate shape and including an electricity generator and a casing accommodating the electricity generator; and
an outer case accommodating the cell stack, the outer case including an outer layer having a folded portion located in a surface area of the outer layer between an outer edge of the outer case and an outer periphery of the cell stack in a direction perpendicular to the stacking direction, the folded portion of the outer layer defining at least one rib protruding outward in the stacking direction from the surface area of the outer layer.

15. An electrochemical cell system, comprising:
at least one electrochemical cell module; and
a controller configured to control the at least one electrochemical cell module,
wherein
the at least one electrochemical cell module includes:
- a plurality of electrochemical cells;
- a current collector electrically connecting the plurality of electrochemical cells to one another; and
- a housing accommodating the plurality of electrochemical cells, each of the plurality of electrochemical cells includes:
- a cell stack including a plurality of unit cells stacked on one another in a stacking direction of the cell stack, each of the plurality of unit cells having a plate shape and including an electricity generator and a casing accommodating the electricity generator; and
- an outer case accommodating the cell stack, the outer case including an outer layer having a folded portion located in a surface area of the outer layer between an outer edge of the outer case and an outer periphery of the cell stack in a direction perpendicular to the stacking direction, the folded portion of the outer layer defining at least one rib protruding outward in the stacking direction from the surface area of the outer layer.

* * * * *